United States Patent
Hansen et al.

(10) Patent No.: US 6,739,084 B1
(45) Date of Patent: May 25, 2004

(54) FISHING ROD RACK ASSEMBLY FOR PICK UP TRUCK

(76) Inventors: Thomas R. Hansen, 405 Elizabeth Ave., Toms River, NJ (US) 08753; Michael Sutton, 4 Coville Dr., Brownsmills, NJ (US) 08015

( * ) Notice: Subject to any disclaimer, the term of this patent is extended or adjusted under 35 U.S.C. 154(b) by 0 days.

(21) Appl. No.: 10/367,262

(22) Filed: Feb. 19, 2003

(51) Int. Cl.⁷ ............................................. A01K 97/10
(52) U.S. Cl. ...................................................... 43/21.2
(58) Field of Search ...................... 43/21.2; 224/922, 224/402, 403, 405; 248/541, 230.5, 314, 200.1, 227.4, 228.5; 211/70.8

(56) References Cited

U.S. PATENT DOCUMENTS

| | | | | |
|---|---|---|---|---|
| 1,220,443 A | * | 3/1917 | Friede | 238/94 |
| 2,055,842 A | * | 9/1936 | Haislip | 248/517 |
| 3,304,035 A | * | 2/1967 | Davis | 248/516 |
| 3,484,066 A | * | 12/1969 | Aunspaugh | 248/541 |
| 4,157,803 A | * | 6/1979 | Mack | 248/512 |
| 4,270,724 A | * | 6/1981 | McMullen | 248/534 |
| 4,527,349 A | * | 7/1985 | Emory, Jr. | 43/21.2 |
| 4,869,195 A | * | 9/1989 | Eichfeld | 114/364 |
| 4,938,403 A | * | 7/1990 | Cortelli | 224/310 |
| 5,435,093 A | * | 7/1995 | Minorics et al. | 43/19.2 |
| 5,673,507 A | * | 10/1997 | Stokes, Jr. | 43/21.2 |
| 5,685,107 A | * | 11/1997 | Sweet | 43/21.2 |
| 5,813,164 A | * | 9/1998 | Liberto | 43/21.2 |
| 6,059,159 A | * | 5/2000 | Fisher | 224/403 |
| 6,289,627 B1 | * | 9/2001 | Gibbs et al. | 43/21.2 |
| 2003/0071098 A1 | * | 4/2003 | Martin | 224/405 |

FOREIGN PATENT DOCUMENTS

DE    4218277 A1 * 12/1993 .......... A01K/97/10

* cited by examiner

*Primary Examiner*—Peter Poon
*Assistant Examiner*—Joan M. Olszewski
(74) *Attorney, Agent, or Firm*—Clifford G. Frayne

(57) ABSTRACT

A fishing rod rack for the support of a plurality of fishing rods, the fishing rod rack spanning the width of the bed of a pick up truck. The fishing rod rack has a two piece bracket member at each end for engaging the inward lip of the respective side walls, there being a support rod extending between opposing bracket members. A plurality of support tubes are rotatably secured to the support rod by a clasp member rotatable about the support rod and secured in angular position by a pair of set screws.

6 Claims, 2 Drawing Sheets

US 6,739,084 B1

FISHING ROD RACK ASSEMBLY FOR PICK UP TRUCK

BACKGROUND OF THE INVENTION

1. Field of the Invention

The present invention relates to a fishing rod rack assembly for supporting a plurality of fishing rods and more particularly to a fishing rod rack assembly which is removably engageable with the side walls of a bed of a pick up truck for the support of a plurality of fishing rods.

2. Description of the Prior Art

When a fisherman travels from his home to a location where he is going to conduct fishing, one of his concerns is for the protection of his fishing tackle, including the fishing rod and reel. If the fishing rod can be broken down into several components, then the transport of the rod is relatively easy. However, with some fishing rods such as surf casting rods, they do not break down and their length is sometimes in excess of 14 feet, and vertical clearance can become a problem with trees, power lines, toll booths, etc.

One solution for transporting rods of this type was to fashion a rod rack out of tubular material which would fasten to the front bumper and frame of the vehicle and support vertically oriented tubes into which the fishing rod could be slidably mounted, thereby transporting them in a vertical orientation at the front of the vehicle. This allows for the transport of a plurality of rods, but the rack itself requires some effort in order to install to the under chassis of the vehicle. Still further, in fabricating this rack, there is a certain limitation as to the number of vertical tubes that can be engaged on the rack for support of fishing rods.

Another solution to the problem has been roof racks for vehicles such as SUVs and station wagons in which the pole can be clamped in place or placed in tubes in a horizontal position on the roof of the vehicle. In such a situation, the placement of the roof rack requires some degree of effort and it is not easily removed and the positioning of fishing rods into the horizontal tubes or clamps is somewhat cumbersome.

Applicant has developed a fishing rod support rack which is cooperative with the side walls of a pick up truck and allows for quick installation and quick removal and can accommodate a greater number of fishing rods than currently available with fishing rod racks available in the market place, and can support those fishing rods at any selected angle from the horizontal to the vertical to enable the vertical clearance issue to be addressed.

OBJECTS OF THE INVENTION

An object of the present invention is to provide for a novel fishing rod rack for the support of fishing rods during transportation, which rack is easily installed and/or removed from the bed of a pick up truck.

Another object of the present invention is to provide for a novel fishing rod rack which can support a plurality of poles at any angle between the horizontal and the vertical.

A still further object of the present invention is to provide for a novel fishing rod rack for support of a plurality of fishing rods which allows fishing rods to be angularly stored on both sides of the support rod.

A still further object of the present invention is to provide for a novel fishing rod rack which allows the user to address vertical issues.

SUMMARY OF THE INVENTION

A fishing rod rack for the support of a plurality of fishing rods, the fishing rod rack spanning the width of the bed of a pick up truck, the fishing rod rack having a two piece bracket member at each end for engaging the inward lip of the respective side walls, there being a support rod extending between opposing bracket members, there being a plurality of support tubes rotatably secured to the support rod by a clasp member rotatable about the support rod and secured in angular position by a pair of set screws.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
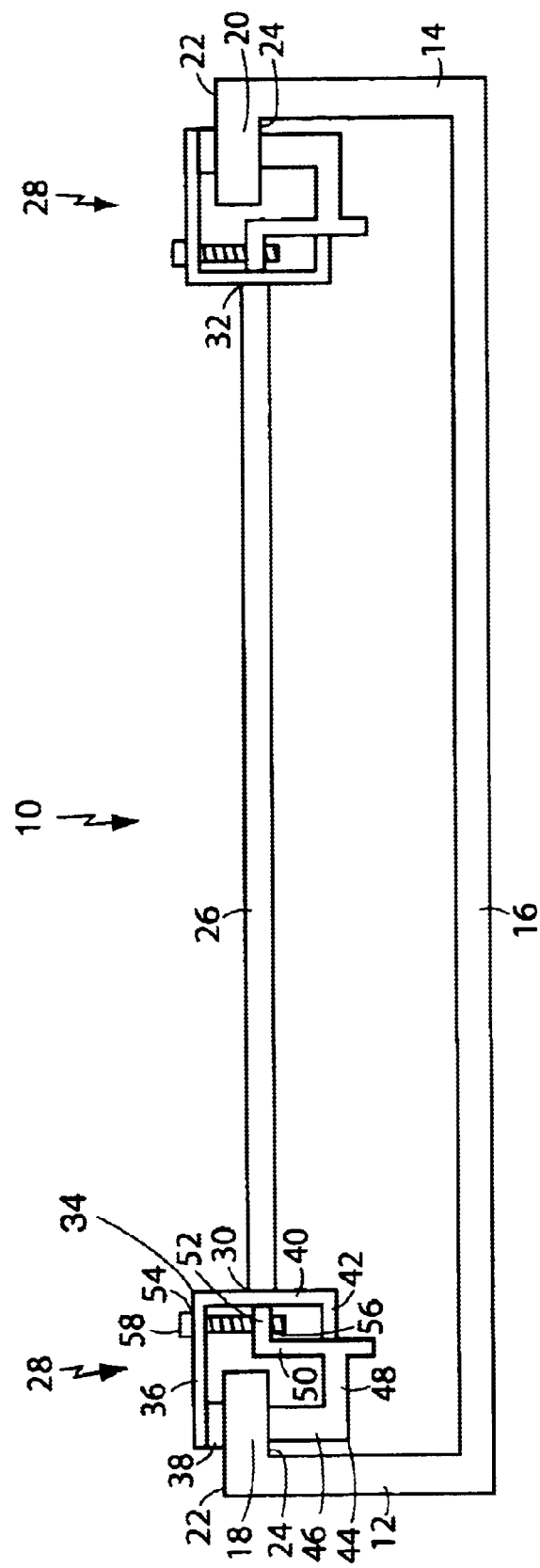
FIG. 1 is a side view of the fishing rod rack assembly as viewed from the rear end of a pick up truck bed.

FIG. 1 is a side view of the fishing rod rack assembly of the present invention as viewed from the open end of the bed of a pick up truck. The fishing rod rack assembly 10 is secured in an elevated orientation between the side walls 12 and 14 of the bed 16 of the pick up truck. The majority of pick up trucks come with three types of bed widths, standard, mid size, and compact. In all types, each side wall normally has an inwardly depending horizontal flange 18 and 20 defined by an upper surface 22 and a lower surface 24. Applicant's assembly may be fabricated to fit each of the aforesaid bed types or any irregular bed width.

The first element of Applicant's fishing rod rack assembly is a tubular cross bar 26 preferably circular in cross section and rigid enough to support a plurality of fishing poles. Tubular cross bar 26 has an identical clamp mechanism 28 secured at its first end 30 and its second end 32 which clamp mechanism engages the horizontal flange 18 and 20 of side walls 12 and 14. Clamp mechanism 28 comprises a first C-shaped member 34 having a first horizontal leg 36 and flange engaging surface 38 positioned on upper surface 22 of flange 18 or 20. First C-shaped member 34 has a vertical leg 40 which is secured to the first horizontal leg 36 and also to the tubular cross bar 26. Vertical leg 40 ends with a short horizontal leg 42 positioned below lower surface 24 of flange 18 or 20. The second clamp member 44 is again C-shaped in cross section having a first vertical leg 46 in frictional engagement with the lower surface 24 of flanges 18 or 20 and terminating with a horizontal leg 48 extending beyond the end of flange 18 or 20 and a second vertical leg 50 extending below horizontal leg 48 and above horizontal leg to a point proximate flange 18 or 20 wherein second vertical leg 50 terminates with a horizontal lip 52 extending towards the opposing side wall. Formed in first horizontal leg 36 of first clamp member 34 is a throughbore 54 which is aligned with a threaded throughbore 56 formed on the lip member 52 of second vertical leg 50 of second clamp member 44. A threaded fastener 58 extending through the aforesaid throughbores tightens first clamp member 36 and second clamp member 48 while simultaneously frictionally engaging the upper surface 22 and lower surface 24 of flanges 18 and 20.

Figure 2:
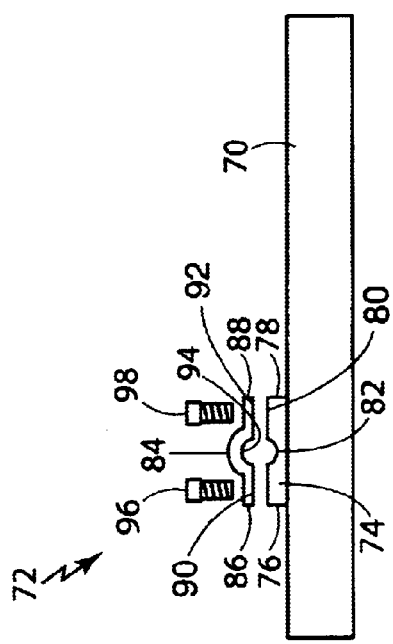
FIG. 2 is a side view of the fishing rod support tube assembly and mounting clasp.

FIG. 2 is a side view of a tubular fishing rod holder 70 and the associated mounting clasp 72 for mounting same on tubular cross bar 26. The tubular fishing rod holder 70 is generally circular in cross section and of a length and dimension sufficient to slidably receive the butt end of a fishing rod. Mounting clasp 72 secures the tubular rod holder 70 in selected angular rotation on tubular cross member 26.

The mounting clasp 72 comprises a first clasp member 74 having a first end 76 and a second end 78, first clasp member 74 being generally flat on its upper surface 80 proximate the first end 76 and the second end 78 in order to accommodate a threaded bore proximate each end. First clasp member 74 is secured to tubular rod holder 70 by any suitable method, but preferably welded. An arcuate surface 82 is formed on first class member 74 between threaded bores, the arcuate surface 82 conforming to a portion of the circumference of tubular cross member 26.

Second clasp member 84 is generally C-shaped, having a first end 86 and a second end 88 with lower surfaces 90 and 92 complimentary with planar surface 80 on first clasp member, the upper surface of second clasp member having a planar portion proximate its ends 86 and 88 to accommodate a throughbore alignable with said threaded bore in said first clasp member 74, there being an arcuate surface 94 between said throughbores complimentary with a portion of the circumference of the tubular cross member 26 such that when first clasp member 74 and second clasp member 84 are joined and threaded fasteners 96 and 98 are introduced into the bores and secured, an aperture conforming to the outer dimension of the tubular cross member 26 is formed. This arrangement allows for a plurality of tubular rod holders 70 to be frictionally secured to tubular cross member 26 in a variety of angularly rotational selections.

Figure 3:
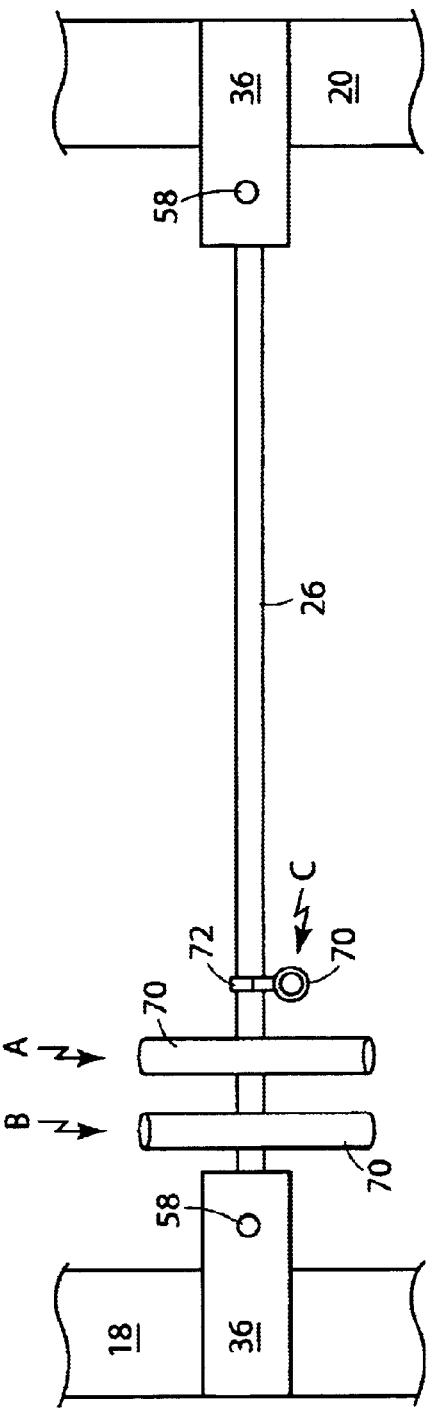
FIG. 3 is a top view of the fishing rod assembly secured between the side walls of a pick up truck.

FIG. 3 is a partial top view of the fishing pole holding assembly 10 secured to the side walls 12 and 14 of a pick up truck bed 16. It should be noted that the user can position and secure the tubular rod holders 70 via the clasp member 72 to either a rearward angle configuration "A", a forwardly angled configuration "B", or a directly vertical configuration "C". Still further, by being able to stagger the forward and rearward angularity of adjacent tubular rod holders 70, the user can store many more poles on the fishing rod rack assembly. This is due to the fact that large fishing rods oftentimes have large reels which extend significantly to both sides of the rod. Therefore the tubular rod holder clasp 72 of an adjacent tubular rod holder 70 would have to be spaced some distance apart in order to accommodate an adjacent pole with a similarly large reel. However, by having the tubular rod holders 70 staggered forwardly and rearwardly, the spaced apart distance between adjacent tubular rod holders 70 is reduced to the diameter of the tubular rod holder 70.

Applicant's fishing rod rack assembly solves the aforesaid problem of accommodating more rods, still further, allows the entire assembly to be removed and stored so that the pick up truck can be used for its other intended purposes, yet still be intalled quickly and easily with only a single wrench.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

We claim:

1. A fishing rod rack assembly for support of a plurality of fishing rods between the sidewalls of the bed of a pick up truck, said fishing rod rack assembly comprising:
   a tubular cross member having a first end and a second end and extending transverse a bed of a pick up truck perpendicular to opposing side walls of said bed;
   a clamp mechanism positioned at said first end and said second end of said tubular cross member for removably securing said cross member to an inwardly depending flange on said opposing side walls of said bed, said flange having upper and lower surfaces;
   a plurality of tubular fishing rod holders, each having a mounting clasp for mounting said fishing rod holders in independent selected angular rotation about said tubular cross member, each of said tubular fishing rod holders for the slidable receipt of a butt end of a fishing rod.

2. The fishing rod rack assembly in accordance with claim 1 wherein said clamp mechanism comprises:
   a first clamp member generally C-shaped in cross section having a first horizontal leg having a flange engaging surface for frictional engagement with said upper surface of said flange of one of said opposing sidewalls a vertical leg secured to said first horizontal leg and secured to said tubular cross member;
   a second horizontal leg secured to said vertical leg and disposed below said lower surface of said flange;
   a second clamp member generally C-shaped in cross section having a first vertical leg for frictional engagement with said lower surface of said flange of said one opposing side wall, a horizontal leg secured to said first vertical leg and extending beyond said flange, a second vertical leg extending below said horizontal leg and upwardly towards said lower surface of said flange terminating with a horizontal lip extending in the direction of the other said of opposing side walls; and
   a throughbore in said first horizontal leg of said first clamp member and an aligned threaded throughbore in said horizontal lip of said second clamp member for receipt of a threaded fastener for frictional engagement of said clamp mechanism to said flange of said one opposing side wall.

3. A fishing rod rack assembly in accordance with claim 1 wherein said mounting clasp for said tubular fishing rod holder comprises:
   a first clasp member having a first end and a second end secured to said tubular fishing rod holder and having a threaded bore formed proximate said first end and said second end and an arcuate surface complimentary with a portion of said tubular cross member disposed between said threaded bores;
   a second clasp member having a first end and a second end having throughbores formed proximate said first end and second end and alignable with said threaded bores of said first clasp member, said second clasp member having an arcuate surface disposed between said throughbores, said arcuate surface of said second clasp member complimentary with a portion of said tubular cross member;
   a threaded securing means engagable in said respective throughbores and threaded bores for frictional engagement of said mounting clasp and said tubular fishing rod holders about said tubular cross member at a selected angular orientation.

4. The fishing rod rack assembly in accordance with claim 1 wherein said assembly allows orientation of said tubular fishing rod holders in a forward angular orientation, rearward angular orientation or vertical orientation.

5. The fishing rod rack assembly in accordance with claim 2 wherein said first clamp member of said clamp mechanism is secured to said tubular cross member by welding.

6. A fishing rod rack assembly in accordance with claim 3 wherein said first clasp member of said mounting clasp is secured to said tubular fishing rod holder by welding.

* * * * *